United States Patent
Hu

(10) Patent No.: US 9,201,978 B2
(45) Date of Patent: Dec. 1, 2015

(54) METHODS, APPARATUS AND SYSTEM FOR PROVIDING AND RETRIEVING WEB CONTENTS

(75) Inventor: Xiao Wei Hu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1657 days.

(21) Appl. No.: 11/943,612

(22) Filed: Nov. 21, 2007

(65) Prior Publication Data

US 2008/0126361 A1    May 29, 2008

(30) Foreign Application Priority Data

Nov. 23, 2006 (CN) .......................... 2006 1 0146848

(51) Int. Cl.
*G06F 17/30* (2006.01)
*G06F 7/00* (2006.01)
*H04L 29/08* (2006.01)

(52) U.S. Cl.
CPC .... *G06F 17/30902* (2013.01); *G06F 17/30873* (2013.01); *H04L 67/28* (2013.01); *H04L 67/2861* (2013.01)

(58) Field of Classification Search
CPC .................... G01F 17/30902; G01F 17/30899
USPC .................................................. 707/617, 695
See application file for complete search history.

(56) References Cited

U.S. PATENT DOCUMENTS

| 6,236,991 B1 | 5/2001 | Frauenhofer et al. |
| 6,349,296 B1 * | 2/2002 | Broder et al. .......................... 1/1 |
| 6,553,412 B1 | 4/2003 | Kloba et al. |
| 6,633,316 B1 | 10/2003 | Maddalozzo, Jr. et al. |
| 7,085,753 B2 * | 8/2006 | Weiss et al. ................... 707/710 |
| 7,574,433 B2 * | 8/2009 | Engel ..................................... 1/1 |
| 2001/0011365 A1 | 8/2001 | Helfman |
| 2002/0107735 A1 * | 8/2002 | Henkin et al. .................. 705/14 |
| 2002/0143797 A1 * | 10/2002 | Zhang et al. ................... 707/200 |
| 2004/0167928 A1 * | 8/2004 | Anderson et al. .......... 707/104.1 |
| 2005/0015713 A1 | 1/2005 | Plastina et al. |
| 2006/0021068 A1 | 1/2006 | Xu et al. |

FOREIGN PATENT DOCUMENTS

| CN | 1808435 A | 2/2006 |
| CN | 1339748 A | 8/2008 |
| WO | 2005002151 A1 | 1/2005 |

* cited by examiner

*Primary Examiner* — Jeffrey A Burke
(74) *Attorney, Agent, or Firm* — Ryan Lewis; Hoffman Warnick LLC

(57) ABSTRACT

A method for providing web contents for offline usage, includes: grouping web contents, wherein web contents contained in each group have certain logical association among them; providing a client with information describing said group; and, providing, in response to said client's request for a web content group, said client with corresponding web contents based on the group, so that said client can present to a user web contents of the group offline. A corresponding web application server, client module and computer program products are further provided. A user can conveniently and flexibly download, according to group information of web contents, a group of interest among web contents for offline usage without a need for downloading and maintaining undesired web contents.

17 Claims, 7 Drawing Sheets

METHODS, APPARATUS AND SYSTEM FOR PROVIDING AND RETRIEVING WEB CONTENTS

FIELD OF THE INVENTION

Figure 1:
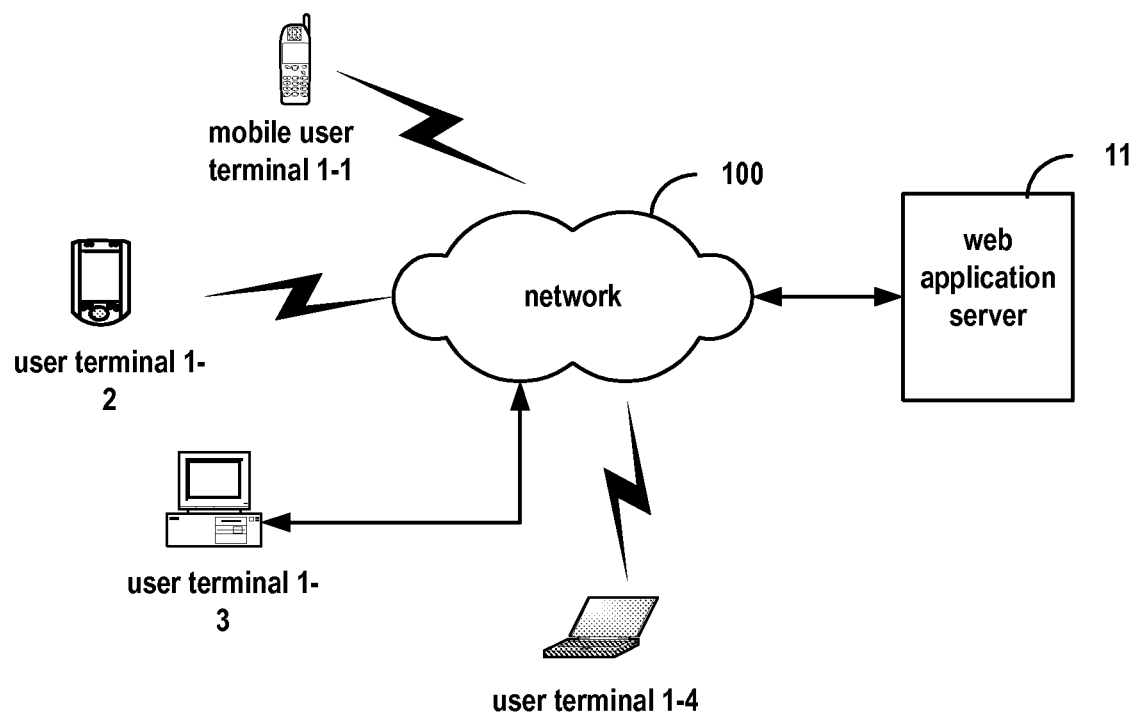

The present invention generally relates to providing and retrieving Web contents and, in particular, to methods for providing and retrieving Web contents for offline usage as well as a relevant apparatus and system.

BACKGROUND OF THE INVENTION

Copious web contents in websites are created for online usage by users. However, there are many cases in which users want to use these web contents offline, i.e., after user terminals are disconnected from the network, so that web contents can be still available for the users. From the users' perspective, another advantage of offline usage of web contents lies in reducing network communication expense.

To meet demand for offline usage of web contents by the users, many web browsers have the capability to locally cache web contents for offline access. Browsers cache web contents based on navigation history and/or the expiration date of the accessed contents. In other words, most browsers can only provide the accessed (opened) web contents for offline usage.

On the other hand, some special-purpose clients (download tools) can also download web contents into client machines for offline usage. Users usually need to specify for these clients specific limiting conditions for retrieving web contents, and then clients will retrieve all web contents that meet these conditions. For example, users need to specify page entry points and page depth, so that the clients can start from the page entry points and download all pages within the page depth into the client machines for offline usages by users.

Another example of the above clients is a RSS (Really Simple Syndication) client. The RSS client allows users to specify a list of Uniform Resource Locators (URL), which are defined as channels. Then, the RSS client can get the contents to which these URLs are directed for offline usage. The RSS clients of this kind can only get one or specified layer of web contents but do not support random selection of web contents to form a certain web application and make it available for offline usage.

From the perspective of websites, their functions are to help users solve problems, for example, provide information on a certain subject, receive user input information on a certain subject, etc. These relevant web contents are usually associated with one another and spread in layers of different depth. According to the existing solution of providing web contents for offline usage, when users want to use these web contents offline, web contents to be used offline have to be accessed or specified on the browser or client side piece-by-piece, or all web contents in the same layer as these web contents have to be retrieved.

Therefore, the existing solution of retrieving or providing web contents is not quite flexible, and it is impossible to only retrieve useful web contents for a specific application in a convenient manner for offline usage. Moreover, all web contents should be consistent on the client side. When actions such as an update are needed, all contents should be updated at the same time. This makes the management (including creation, update and deletion) of offline web contents time-consuming and strenuous.

SUMMARY OF THE INVENTION

To solve the problems in the prior art, the present invention proposes a technique capable of specifying and providing a specific portion of web contents on a web site and making them available for offline usage, wherein the web contents are grouped according to applications, the web contents to be used offline are provided/retrieved and then managed according to their groups.

According to a first aspect of the present invention, a method for providing web contents for offline usage, comprises: grouping web contents, wherein web contents contained in each group have certain logical association among them; providing a client with information describing said group; and, providing, in response to said client's request for a web content group, said client with corresponding web contents based on the group, so that said client can present to a user the web contents of the group offline.

According to a second aspect of the present invention, a web application server, comprises: group managing means for grouping web contents, wherein web contents contained in each group have certain logical association among them; group information providing means for providing a client with information describing said group; web content providing means for providing, in response to said client's request for a web content group, said client with corresponding web contents based on the group, so that said client can present to a user the web contents of the group offline.

According to a third aspect of the present invention, a method for retrieving web contents for offline usage, comprises: receiving from a web application server group information on grouped web contents; requesting desired web contents to said web application server based on the grouping information; and receiving web contents of said group from said web application server, so as to present to a user the web contents of the group offline.

According to a fourth aspect of the present invention, a client module for retrieving web contents for offline usage, comprises: group information receiving means for receiving from a web application server group information on grouped web contents; requesting means for requesting desired web contents to said web application server based on a group; and web content receiving means for receiving web contents of said group from said web application server, so as to present to a user the web contents of the group offline.

According to a fifth aspect of the present invention, a computer program product and a network system for implementing the method according to the present invention is provided.

With the present invention, the user can conveniently and flexibly download, according to group information of web contents, a group(s) of interest among web contents for offline usage without a need for downloading all web contents provided by a website or specifying concrete parameters for downloading web contents. Since the grouping of web contents can be performed on the content provider side, i.e., on the server side, more efficient classification of web contents in accordance with applications thereof can be achieved, and various logical associations among web contents are reflected well. In this manner, the user can get sufficient desired web contents for offline usage without a need for downloading and maintaining undesired web contents.

Other features and advantages of the present invention will become apparent from the following detailed description, when taken in conjunction with the accompanying drawings.

BRIEF DESCRIPTION ON THE DRAWINGS

Figure 2:
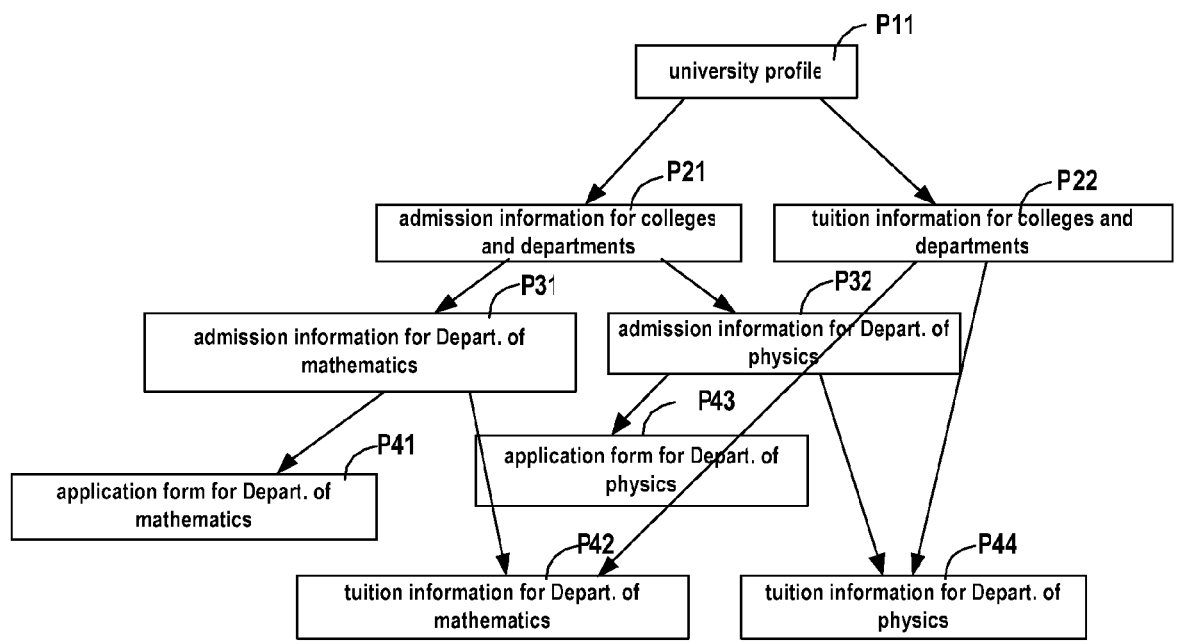
Figure 3:
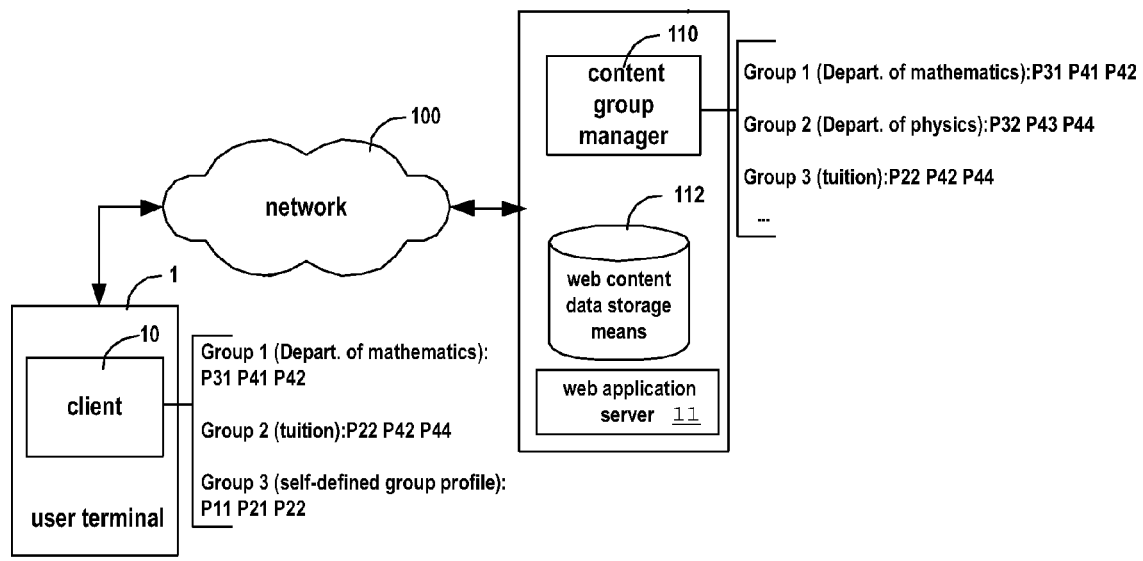
Figure 4:
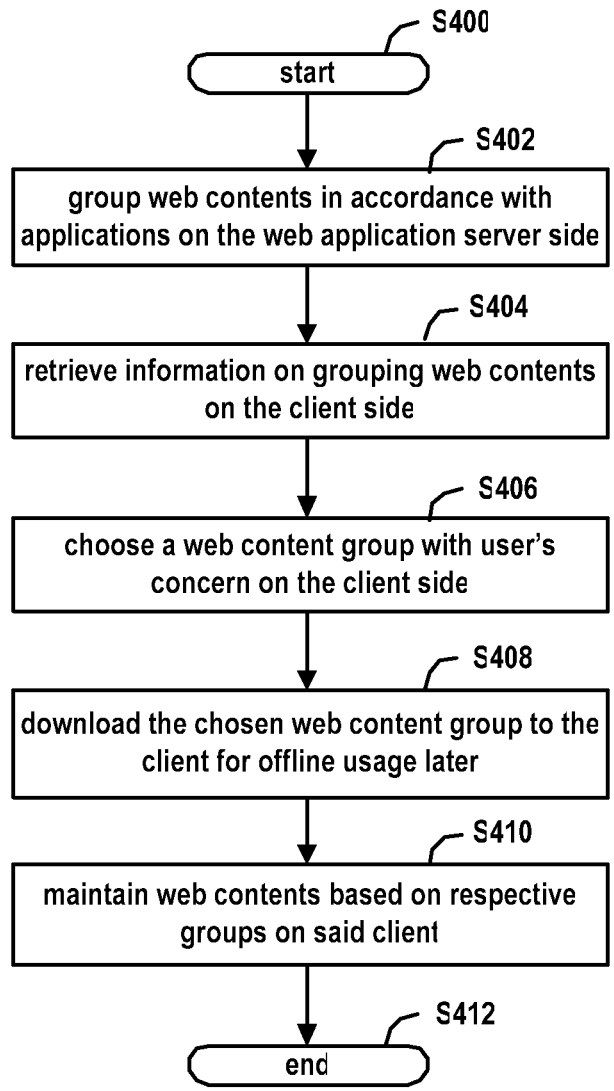
Figure 5:
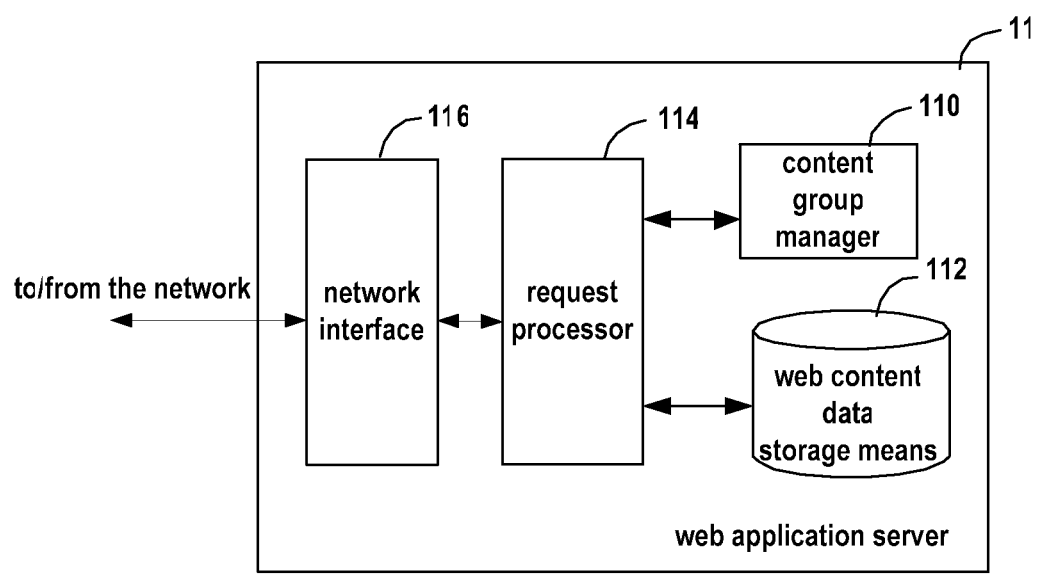
Figure 6:
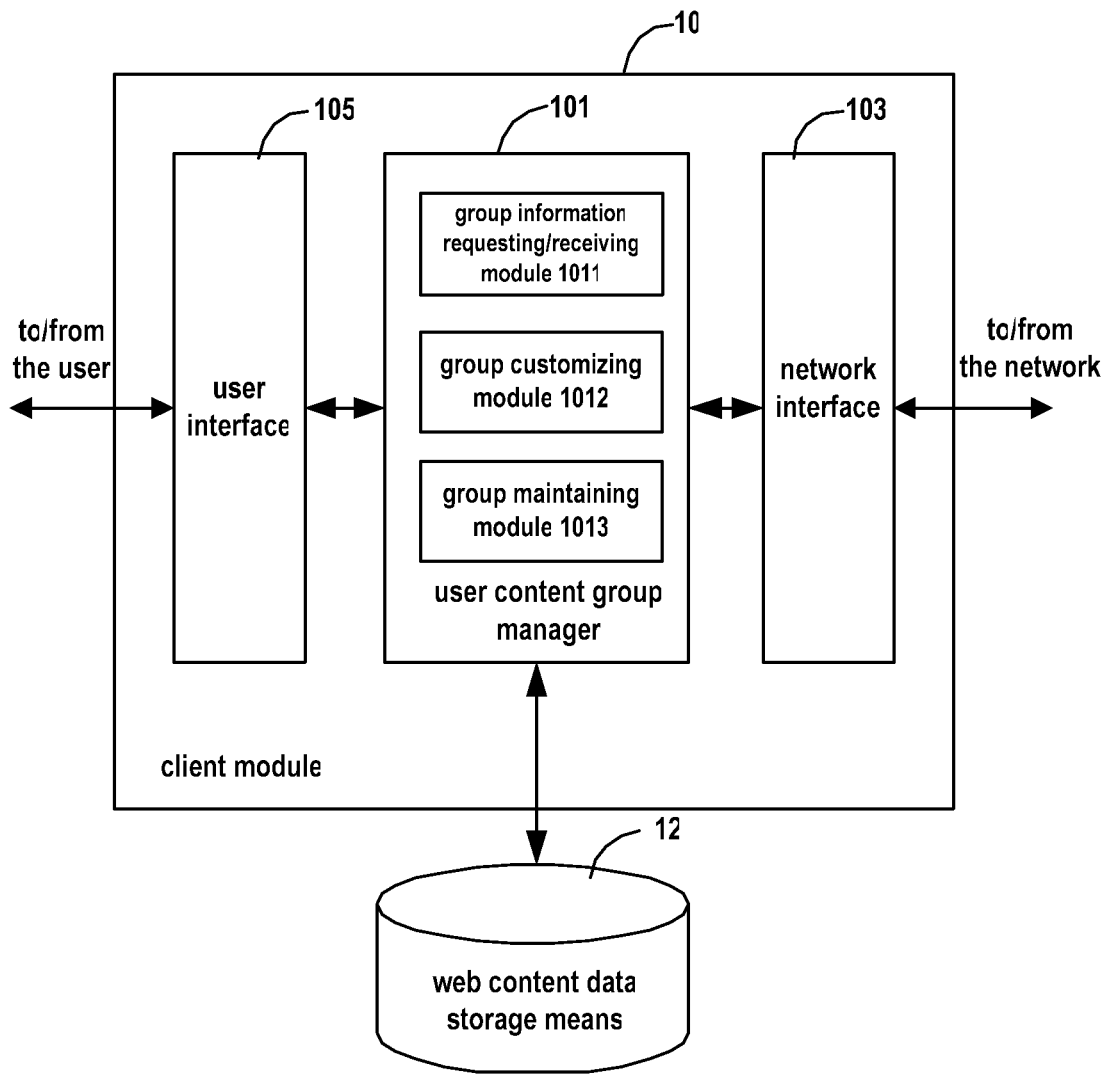
Figure 7:
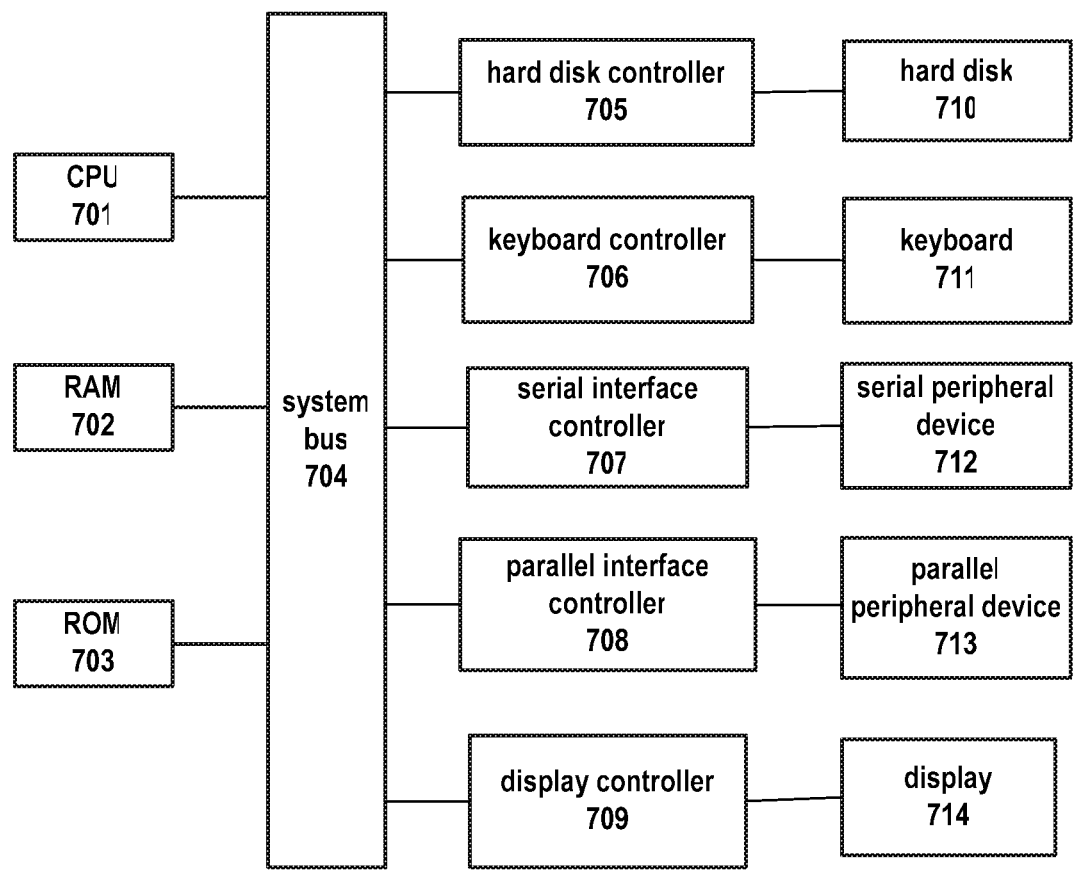

Reference will be made to the following accompanying drawings to set forth in detail features and advantages of embodiments of the present invention. If possible, like or similar reference numerals designate the same or similar parts throughout the figures and description thereof, in which:

FIG. 1 schematically depicts a network system in which embodiments of the present invention can be applied;

FIG. 2 schematically depicts an example of a website structure;

FIG. 3 schematically depicts a network example implementing embodiments of the present invention;

FIG. 4 schematically depicts a flowchart of providing web contents to be used offline according to an embodiment of the present invention;

FIG. 5 schematically depicts a web application server according to an embodiment of the present invention;

FIG. 6 schematically depicts a client for offline accessing web contents according to an embodiment of the present invention; and FIG. 7 schematically depicts a computer device in which embodiments according to the present invention can be implemented.

DETAILED DESCRIPTION

The present invention will be set forth according to the accompanying drawings.

FIG. 1 schematically depicts a network system in which embodiments of the present invention can be applied.

A web application server 11 provides web contents to user terminals 1-1, 1-2, 1-3 and 1-4 via a network 100. The network 100 may comprise a data transmission network such as the Internet or a Public Land Mobile Network (PLMN). The user terminals may comprise either user terminals that are connected to the network 100 via mobile/wireless technique, such as the mobile telephone 1-1, the personal digital assistant 1-2 and the laptop computer 1-4, or user terminals that are connected to the network 100 via fixed lines, such as the desktop computer 1-3, etc. Users can access a web application server 11 with various user terminals that are connected to the network 100, so as to retrieve web contents provided by the web application server 11. As mentioned in the Background of the Invention, the users usually retrieve web contents available for offline usage via browsers or special-purpose clients. Hereinafter, the term "client" comprises any kind of browser(s) and/or special-purpose client(s) that support offline usage of web contents.

Usually, content providers provide web contents via the web application server 11, wherein the web contents include page contents and various media contents. Since web contents are logically associated with one another, the content providers typically set up links among web content data according to a certain intrinsic logic association. For example, FIG. 2 schematically depicts an example of a website structure provided by the web application server.

The example of FIG. 2 shows a website structure of a university. In this example, web contents are provided in the form of pages. A page P11 is the homepage of the university, on which the profile of the university is released. A plurality of lower-level pages is linked with the homepage P11, including a page P21 on which school and department admission information is released and a page P22 on which college and department tuition information is released. It is able to link via the page P21 for college and department admission information to lower-level pages, i.e., a page P31 on which admission information of the mathematics department is released and a page P32 on which admission information of the physics department is released. And it is able to find, via the page P31 for the admission information of the mathematics department and the page P32 for the admission information of the physics department, pages P41 and P43 on which application forms for the respective departments are released and pages P42 and P44 on which tuition information for the respective departments are released. Additionally, the page P22 on which the college and department tuition information is released includes direct links to pages P42 and P44 for the tuition information of the mathematics and physics departments.

FIG. 3 schematically depicts a network example implementing embodiments of the present invention.

As depicted in FIG. 3, according to an embodiment of the present invention, on the side of the web application server 11, in addition to provision of the web contents based on the structure as depicted in FIG. 2 for the users, the web contents are grouped in accordance with applications, so that the respective web contents in a group have a specific association with one another. Moreover, the groups of web contents are managed in a content group manager 110.

For example, the web contents depicted in FIG. 2 can be grouped as depicted in Table 1.

TABLE 1

Example of Groups of Web Contents

| Serial Number | Name | Content Element |
| --- | --- | --- |
| 1 | Depart. of Mathematics | P31, P41, P42 |
| 2 | Depart. of Physics | P32, P43, P44 |
| 3 | Tuition | P22, P42, P44 |
| 4 | ... | ... |

It can be seen that the content elements in group 1 are the pages associated with information of the department of mathematics, the content elements in group 2 are the pages associated with information of the department of physics, and the content elements in group 3 are the pages associated with tuition. Likewise, other groups may also be defined.

User equipment 1 may be any of the user terminals that are connected to the network 100, including the user terminals 1-1, 1-2, 1-3 and 1-4 depicted in FIG. 1. When the user starts a client 10 on the user equipment 1, depending on the specific configuration of the client 10, the client 10 may directly send a request for retrieving a list of web content groups to the web application server 11 or send an indicator for retrieving a list of web content groups to the web application server 11 in accordance with the user's instructions. The client 10 may display the list of the web content groups to the user via its user interface, and then the user chooses to download those groups of interest for offline usage. In this manner, when the user needs the web information of the department of mathematics, he/she does not need to download the web information of the department of physics at the same time, thereby saving resources for data transmission and data storage. Moreover, according to an embodiment of the present invention, it also helps to maintain downloaded web contents on the client. For example, when there is a need to update, delete and add a web application, such as the web information of the department of physics, the operation may be performed directly on this group without involving other unassociated page contents. That is to say, all operations for web contents for offline usages are performed on the basis of content groups on the client 10. In an example of the present invention, the user can also customize content groups with his/her concern using the client. How to customize content groups will be described in detail below.

FIG. 4 schematically depicts a flowchart of providing web contents for offline usage according to an embodiment of the present invention.

uniquely, like a Uniform Resource Locator. The content group manager 110 may define groups of web contents for example with Extensible Markup Language (XML) as:

```
<group id = 'group 1', desc='information of department of mathematics' alias =
'department of mathematics'>
    < /entry url = 'admission information of department of mathematics.html', id=P31,
layer = 1>
    < /entry url='tuition information of department of mathematics.html', id=P42,
layer=2>
    </entry url='application form of department of mathematics.html', id=P41,
layer=2>
</group>
<group id = 'group 2', desc='information of department of physics' alias =
'department of physics'>
    < /entry url = 'admission information of department of physics.html', id=P32, layer = 1>
    < /entry url='tuition information of department of physics.html', id=P44, layer=2>
    </entry url='application form of department of physics.html', id=P43, layer=2>
</group>
<group id='group 3', desc='tuition information of colleges and departments', alias ='tuition'>
    </entry url='tuition information of colleges and departments.html', id=P22,
layer=1>
    </entry url='tuition information of department of mathematics.html', id=P42,
layer=3>
    </entry url='tuition information of department of physics.html', id=P44, layer =
3>
</group>
    ......
```

The processing flow starts in S400.

In S402, web contents are grouped in accordance with applications on the web application server side. The relationship between respective elements of these groups may be different from the relationship exhibited during providing web content elements for users. That is to say, a group reflects a specific association between respective web content elements, which might arouse user's concern. The web application server may provide through a content group manager a group identifier for each piece of web contents to identify the group of the web contents.

In S404, web content group information is retrieved, for example, by sending a group retrieval request to the web application server on the client side.

In S406, web content groups with user's concern are chosen on the client side, i.e., the web contents of which group are determined to be downloaded for offline usage. The user may resort to a friendly graphical user interface to make the choice and perform some actions, such as activating some other additional options.

In S408, the client downloads the chosen web content groups and store it locally for future offline usage.

In S410, the client maintains the web contents based on their respective groups, for example, updating, adding and deleting any pieces of web contents.

The operation flow ends in S412.

FIG. 5 schematically depicts a web application server according to an embodiment of the present invention. Reference numeral 11 designates a network application server according to an embodiment of the present invention, 110 a content group manager, 112 storage means for storing data of web contents, 114 a request processor for processing requests from the client and providing requested web contents, and 116 a network interface for interacting with the network.

As depicted in FIG. 5, a web application and relationship are defined for each piece of web contents on the content group manager 110. The association between a web content and a group is defined by the relationship between a group identifier and a web content identifier. The web content identifier is an identifier capable of identifying the web content Upon receipt of a request for retrieving content group information from the client side, the network interface 116 transfers this request to the request processor 114. According to the received request, the request processor 114 retrieves from the content group manager 110 web content groups provided by the web content provider (e.g., a website) and sends the group information to the client that made the request through the network interface 116 via the network.

Upon receipt of a request for some specific web content group(s) from the client, the network interface 116 transfers this request to the request processor 114. Based on the group information saved on the content group manager 110, the request processor 114 sends all the web contents in the requested web content group(s) from the network content data memory 112 to the client that made the request through the network interface 116 via the network, so that the client can provide the user with web contents of the group(s) for offline usage.

Likewise, upon receipt of a request for update or addition from the client in the network interface 116, similar operations to the above are performed and the web contents of a corresponding group are provided to the client via the network.

According to another embodiment of the present invention, the web application server 11 may further receive from the client a message for customizing groups of web contents. Then, the content group manager 110 stores the user's group customization, i.e., creating customized groups for individual users. However, an extra database (not depicted) is needed in this embodiment for managing information of respective web content groups customized by the user.

FIG. 6 schematically depicts a client module for offline accessing web contents according to an embodiment of the present invention. In the figure, reference numeral 10 designates a client module for offline accessing web contents, 101 a user content group manager, 103 a network interface through which users interacts with the network, 105 a user interface for interacting with the users, and 12 storage means for storing web content data. On the user content group manager 101 are further comprised: a group information requesting/receiving module 1011 for receiving group information from a web application server or sending requests for group information; a group customizing module 1012 for customizing group information; and a group maintaining module 1013 for maintaining groups.

After the client module 10 is started or the client module 10 receives the user's indication for retrieving web content group information through the user interface 105, the group information request/receiving module 1011 on the user content group manager 101 sends a request for web content group information provided by the web application server 11 (FIG. 1) to the server through the network interface 103 via the network. Upon receipt of content group information from the web application server 11, (FIG. 1), the network interface 103 transfers the content group information to the user content group manager 101. The group information requesting/receiving module 1011 on the manager 101 receives and stores the content group information. Then, the user content group manager 101 provides the user with the content group information in a certain manner (e.g., with a friendly user graphical interface) through user interface 105, so that the user can chooses groups of interest. According to the user's choice from the user interface 105, the group information requesting/receiving module 1011 on the user content group manager 101 sends a request for a corresponding web information group. Likewise, the request is transferred to the side of the web application server 11 (FIG. 1) via the network. In response to the request, the web application server 11 FIG. 1) provides web contents of the requested group to client module 10. The network interface 103 transfers the received web contents to the user content group manager 101 which controls to store the received web contents to the web content data storage means 12 in accordance with their groups, so that during offline operation, the web contents of the retrieved group will be presented to the user through the user interface 105 in response to the user's indication.

Likewise, upon detection of a page needing to be maintained or upon receipt of the user's indication for maintenance such as updating through user interface 105, the group maintaining module 1013 generates a corresponding request for maintaining web contents of the group, such as a request for updating a certain group and a request for adding a certain group. The group information requesting/receiving module 1011 sends the request to the web application server side through the network interface 103 via the network, so that web contents based on a corresponding group are retrieved. In particular, according to an embodiment of the present invention, the user content group manager 101 of the client module 10 further comprises the group customizing module 1012 which enables the user define web content groups. According to the example depicted in FIG. 3, the group customizing module 1012 can define a group "profile," which group comprises the university profile P11, the college and department admission information p21 as well as the college and department tuition information P22. Similar to the customization of groups by the content group manager on the web application server, the group customizing module 1012 can define a self-defined group (of course, the user needs to acquaint himself(herself) with the identifiers for the customized page) with Extensible Markup Language (XML). Next, the group information requesting/receiving module 1011 sends the group customizing request containing the self-defined group information to the web application server through the network interface 103 via the network, so as to retrieve web information based on the customized group. Thus, the user can conveniently use web contents of the group offline.

FIG. 7 schematically depicts a computer device capable of implementing embodiments according to the present invention.

The computer system shown in FIG. 7 comprises a CPU (Central Processing Unit) 701, a RAM (Random Access Memory) 702, a ROM (Read Only Memory) 703, a system bus 704, a HD (Hard Disk) controller 705, a keyboard controller 706, a serial interface controller 707, a parallel interface controller 708, a display controller 709, a hard disk 710, a keyboard 711, a serial external device 712, a parallel external device 713 and a display 714. Among these components, connected to the system bus 704 are the CPU 701, the RAM 702, the ROM 703, the HD controller 705, the keyboard controller 706, the serial interface controller 707, the parallel interface controller 708 and the display controller 709. The Hard disk 710 is connected to the HD controller 705, and the keyboard 711 to the keyboard controller 706, the serial external device 712 to the serial interface controller 707, the parallel external device 713 to the parallel interface controller 708, and the display 714 to the display controller 709.

The functions of each component in FIG. 7 are well known in the art, and the architecture shown in FIG. 7 is conventional. Such architecture can be applied to not only personal computers but also hand held devices such as hand-held PCs, PDAs (Personal Data Assistants), mobile telephones, etc. In different applications, for example, for implementing a user terminal containing the client module according to the present invention or a server host containing the web application server according to the present invention, some components may be added to the architecture shown in FIG. 7, or some of the components shown in FIG. 7 may be omitted. The whole system shown in FIG. 7 is controlled by computer readable instructions, which are usually stored as software in the hard disk 710, or in EPROM or other non-volatile memory. The software can also be downloaded from the network (not shown in the figure). The software, either saved in the hard disk 710 or downloaded from the network, can be loaded into the RAM 702, and executed by the CPU 701 for implementing the functions defined by the software.

As the computer system shown in FIG. 7 is able to support the solution of providing web contents for offline usage according to the present invention, the computer system merely serves as an example of such computer systems. Those skilled in the art may understand that many other computer system designs are also able to carry out the embodiments of the present invention.

The present invention may further be implemented as a computer program product used by, for example the computer system shown in FIG. 7, which contains codes for implementing the web application server of providing web contents for offline usage according to the present invention, and which may further contain codes for implementing the client module for retrieving web contents for offline usage according to the present invention. The codes may be stored in a memory of other computer system prior to the usage. For instance, the codes may be stored in a hard disk or a removable memory like an optical disk or a floppy disk, or may be downloaded via the Internet or other computer network.

Although the embodiments of the present invention have been described with reference to the accompanying drawings, various modifications or alterations may be made by those skilled in the art within the scope as defined by the appended claims.

The invention claimed is:

1. A method for providing web contents for offline usage, comprising:

storing, in response to a request from a client for grouping web contents, customization information on grouping web contents, wherein the request includes the customization information on grouping web contents specifically for the requesting client;

grouping web contents into groups, wherein web contents contained in each group are logically associated with each other according to the customization information, and providing a list of the groups, wherein grouping the web contents includes associating a unique identifier of each web content with a group identifier;

providing the client with the list of the groups; and providing, in response to a request from the client for a web content group selected from the list of the groups, the client with corresponding web contents based on the selected group, so that the client can present to a user the web contents of the selected group offline.

2. The method according to claim 1, comprising:
providing, in response to a request from the client for maintaining the grouped web contents of the selected group, the client with updated web contents, so that the client can present to the user the web contents of the selected group offline.

3. The method according to claim 1, wherein the unique identifier of the web content is a Uniform Resource Locator.

4. The method according to claim 1, wherein the association of the unique identifier of each web content with a group identifier is implemented with Extensible Markup Language codes.

5. A web application server, comprising:
at least one computing device, including:
a group managing component for storing, in response to a request from a client for grouping web contents, customization information on grouping web contents, wherein the request includes the customization information on grouping web contents specifically for the requesting client, and for grouping web contents into groups, wherein web contents contained in each group are logically associated with each other according to the customization information, and for providing a list of the groups, wherein the grouping of web contents by the group managing component is implemented by associating a unique identifier of each web content with a group identifier;
a group information providing component for providing the client with the list of the groups; and
a web content providing component for providing, in response to a request from the client for a web content group selected from the list of the groups, the client with corresponding web contents based on the selected group, so that the client can present to a user the web contents of the selected group offline.

6. The web application server according to claim 5, wherein the web content providing component is further used for, providing, in response to a request from the client for maintaining the grouped web contents of the selected group, the client with updated web contents, so that the client can present to the user the web contents of the selected group offline.

7. The web application server according to claim 5, wherein the unique identifier of the web content is a Uniform Resource Locator.

8. The web application server according to claim 5, wherein the association of the unique identifier of each web content with a group identifier by the group managing component is implemented with Extensible Markup Language codes.

9. A method for retrieving web contents for offline usage, comprising:
sending, in response to a user inputted group customization, to a web application server, a request for grouping web contents, wherein the request includes customization information on grouping web contents specifically for the user, wherein the customization information associates a unique identifier of each web content with a group identifier;
receiving from the web application server a list of groups of web contents, wherein the web contents in each group are logically associated with each other according to the customization information;
requesting desired web contents from the web application server based on a group selected from the list of groups of web contents; and
receiving web contents of the selected group from the web application server, so as to present to the user the web contents of the selected group offline.

10. The method according to claim 9, comprising:
sending to the web application server a request for maintaining the grouped web contents of the selected group so as to retrieve updated web contents based on the selected group, and updating the selected group so as to present to a user the web contents of the selected group offline.

11. The method according to claim 9, wherein the unique identifier of the web content is a Uniform Resource Locator.

12. The method according to claim 9, wherein the customization information is denoted with Extensible Markup Language codes.

13. A client module for retrieving web contents for offline usage, comprising:
at least one computing device, including:
a customizing component for sending, in response to a user inputted group customization, to a web application server a request for grouping, wherein the request includes customization information on grouping web contents specifically for the user, wherein the customization information associates a unique identifier of each web content with a group identifier;
a group information receiving component for receiving from the web application server a list of groups of web contents, wherein the web contents in each group are logically associated with each other according to the customization information;
a requesting component for requesting desired web contents from the web application server based on a group selected from the list of groups of web contents; and
a web content receiving component for receiving web contents of the selected group from the web application server, so as to present to a user the web contents of the selected group offline.

14. The client module according to claim 13, further comprising:
a maintaining component for sending to the web application server a request for maintaining the grouped web contents of the selected group so as to retrieve updated web contents based on the selected group, and updating the selected group so as to present to a user the web contents of the selected group offline.

15. The client module according to claim 13, wherein the unique identifier of the web content is a Uniform Resource Locator.

16. The client module according to claim 13, wherein the customization information is denoted with Extensible Markup Language codes.

17. A network system comprising:
a web application server, including or executed on at least one computing device, comprising:
  a group managing component for storing, in response to a request from a client for grouping web contents, customization information on grouping web contents, wherein the request includes the customization information on grouping web contents specifically for the requesting client, and for grouping web contents into groups, wherein web contents contained in each group are logically associated with each other according to the customization information, and for providing a list of the groups, wherein the grouping of web contents by the group managing component is implemented by associating a unique identifier of each web content with a group identifier;
  a group information providing component for providing the client with the list of the groups; and
  a web content providing component for providing, in response to a request from the client for a web content group selected from the list of the groups, the client with corresponding web contents based on the selected group, so that the client can present to a user the web contents of the selected group offline; and
a client module comprising:
  a group information receiving component for receiving from the web application server the list of the groups;
  a requesting component for requesting desired web contents of a web content group selected from the list of the groups from the web application server; and
  a web content receiving component for receiving web contents of the selected group from the web application server, so as to present to a user the web contents of the selected group offline.

* * * * *